(12) United States Patent
Leung et al.

(10) Patent No.: US 11,199,895 B2
(45) Date of Patent: Dec. 14, 2021

(54) CLASSIFICATION PREDICTION OF WORKLOAD THERMAL BEHAVIOR

(71) Applicant: Intel Corporation, Santa Clara, CA (US)

(72) Inventors: Patrick Kam-shing Leung, Portland, OR (US); James Hermerding, II, Vancouver, WA (US); Muhammad Abozaed, Portland, OR (US); Gilad Olswang, Kfar Menachem (IL); Moran Peri, Haifa (IL); Ido Karavany, Givot Bar (IL); William Freelove, Hillsboro, OR (US); Sudheer Nair, Hillsboro, OR (US); Tahi Hollander, Tel Aviv (IL); Avishai Wagner, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 16/234,510

(22) Filed: Dec. 27, 2018

(65) Prior Publication Data

US 2019/0129498 A1 May 2, 2019

(51) Int. Cl.
| | |
|---|---|
| *G06F 1/26* | (2006.01) |
| *G06F 1/32* | (2019.01) |
| *G06F 1/3287* | (2019.01) |
| *G06N 5/04* | (2006.01) |
| *G06N 20/00* | (2019.01) |
| *G06F 1/20* | (2006.01) |
| *G06F 1/3234* | (2019.01) |
| *G06F 1/324* | (2019.01) |

(52) U.S. Cl.
CPC ............ *G06F 1/3287* (2013.01); *G06F 1/206* (2013.01); *G06F 1/324* (2013.01); *G06F 1/3243* (2013.01); *G06N 5/04* (2013.01); *G06N 20/00* (2019.01)

(58) Field of Classification Search
CPC ...... G06F 1/3287; G06F 1/3243; G06F 1/324; G06F 1/206; G06N 5/04; G06N 20/00; G06N 5/046; G06N 7/005
See application file for complete search history.

(56) References Cited

U.S. PATENT DOCUMENTS

| | | | |
|---|---|---|---|
| 2008/0098254 A1* | 4/2008 | Altevogt | G06F 1/3203 713/600 |
| 2016/0147280 A1* | 5/2016 | Thomas | G06F 1/206 713/320 |
| 2017/0205863 A1* | 7/2017 | Lee | G06F 1/3206 |
| 2017/0371401 A1* | 12/2017 | Rotem | G06F 9/30145 |

* cited by examiner

*Primary Examiner* — Xuxing Chen
(74) *Attorney, Agent, or Firm* — Schwabe, Williamson & Wyatt, P.C.

(57) ABSTRACT

In one embodiment, a method receives data regarding processing of a workload by a processor. The data is input into a prediction engine configured to classify the data into a plurality of workload classifications. Each workload classification describes different temporal behavior of the workload. Then, the method outputs a prediction for at least one of the plurality of workload classifications, wherein the prediction is used to control performance of the processor in an upcoming period of time.

12 Claims, 5 Drawing Sheets

CLASSIFICATION PREDICTION OF WORKLOAD THERMAL BEHAVIOR

BACKGROUND

A computer processor and system-on-a-chip (SOC) use a feature, sometimes referred to as "turbo", that allows the processor to use much higher single and multi-core frequencies as long as the average power of the processor remains below a programmable power limit. For example, controls are set to allow a peak power limit, sometimes referred to as a power limit 2 (PL2), and an average power limit, sometimes referred to as a power limit 1 (PL1), and an averaging window for power limit 1, sometimes referred to as Tau. The use of the power limits enables the peak power of the processor to rise above the average power for short periods of time to allow for better performance for short duration workloads while staying in the long-term average power budget for thermal constraints of the processor and the chassis holding the processor.

Typically, the power limit PL1, the power limit PL2, and averaging window Tau are fixed values that do not change at runtime. The values are configured for the processor to minimize the burst period of the turbo feature and minimize the power above the average PL1 level. However, fixing the values of power limit PL1, power limit PL2, and the averaging window Tau does not optimize performance between different workloads and within a workload itself. For example, the values may be fixed based on an industry standard benchmark or the default values provided by the SOC manufacturer.

Sometimes, the power limit PL2 default values may exceed three times the power limit PL1 values to realize the full performance of many processor cores. The high PL2/PL1 ratio results in a very short turbo on-time, which prevents workloads that have longer sustained power usage from benefiting from the turbo feature. That is, a bursty workload that has a short burst of power may benefit from the turbo feature; however, a workload that uses low power for a longer period of time may not benefit from the short period of time turbo is turned on.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Some embodiments receive hardware data regarding the performance of a computer processor and use the hardware data to generate a workload behavior prediction for the computer processor over a future time period, such as the next 20 to 30 seconds. A classifier may predict the behavior of a workload being processed by the processor into different workload classifications. For example, based on the workload characteristics as well as on past predictions, the classifier predicts a probability of the workload being executed, at any given moment, to be a number of classifications, such as an idle classification, a battery life classification, a bursty classification, a semi-active classification, and a sustained classification. The temporal characteristics of these workload classifications will be described in more detail below, and other classifications may be appreciated.

Some embodiments then use the prediction to dynamically manage the performance of the processor, such as by modifying thermal constraints of the processor that affect the performance of the processor. For example, some embodiments modify one or more power limits that the processor uses to manage the performance of the processor. In some examples, when the future workload is predicted to be a bursty workload, some embodiments may adjust the value of power limits used to regulate the performance of the processor, such as a power limit PL1 and/or a power limit PL2. In some examples, adjusting the power limit PL2 value to be higher may allow the processor to use the turbo feature for a majority of the burst period of a bursty workload. However, when the classifier predicts the future workload may be in the sustained classification, some embodiments may reduce the value for power limit PL2. The lower power limit PL2 value may allow the processor to apply the turbo feature for longer than compared to using a higher power limit PL2 value. Since the sustained workload may be active for a longer period of time than the bursty workload, allowing the turbo feature to be applied for a longer time may improve the performance of the processor for that type of workload. For example, if a higher power limit PL2 is used for a sustained workload, the turbo feature may use up a thermal budget quickly and then quickly become throttled by the thermal constraints on the processor.

The use of the prediction improves the performance of the processor by adjusting hardware settings based on the current predicted workload, which personalizes the execution to the currently executing workload. This may allow the processor to be more aggressive during workloads with shorter higher power characteristics, but also allowing the processor to maintain the performance of longer lasting workloads with sustained power. The tailoring of the performance of the processor to the temporal characteristics of the workloads to be processed may also improve the battery life as workloads that impact battery life may have thermal constraints more tailored to the profile of the workloads, which more efficiently uses power. Also, the use of the prediction improves the performance of the processor by allowing the processor to be more aggressive during workloads with shorter higher power characteristics.

System Overview

Figure 1:
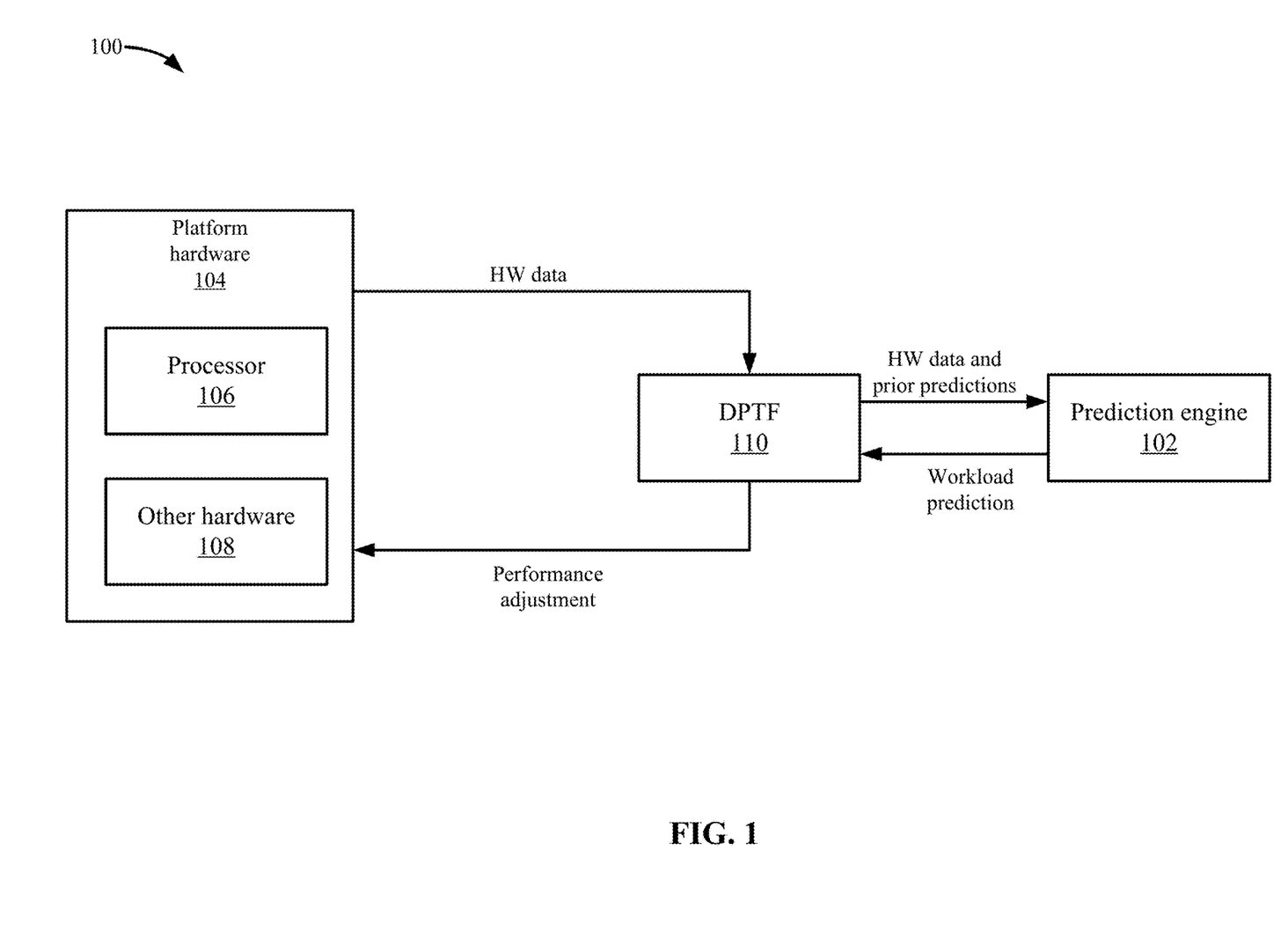
FIG. 1 depicts a simplified system for predicting workload classifications according to some embodiments.

FIG. 1 depicts a simplified system 100 for predicting workload classifications according to some embodiments. System 100 includes platform hardware 104, a dynamic platform thermal framework (DPTF) 110, and a prediction engine 102. Platform hardware 104 may include a processor 106, which may be a central processing unit (CPU), system-on-a-chip (SOC), or other types of processors. Platform hardware 104 also includes other hardware 108, which may include memory, camera/audio hardware, storage, etc.

DPTF 110 may be any platform configured to adjust the performance of processor 106, such as by a platform that can adjust thermal constraints on platform hardware 104. For example, DPTF 110 may dynamically adjust a power limit PL1 and a power limit PL2. Power limit PL1 may be a threshold that average power may not exceed. Power limit PL2 may be a peak power limit that is a threshold that if exceeded, a power limiting process will attempt to limit the spike above power limit PL2. Also, DPTF 110 may adjust an averaging window for power limit PL1 called Tau, which may be a weighting constant that is used in exponentially weighted moving average (EWMA) power averaging calculations to support PL1 limit checking. Although the above constraints are discussed, other controls could be modified to improve performance such as an instantaneous power control (e.g., power limit PL4), a number of active cores, turbo efficiency (EPP) and other controls that adjust the performance of processor 106.

The EWMA may start at zero (or some other value lower than power limit PL1) and then as processor 106 processes a workload thereby using power, the EWMA value changes (e.g., increases). In some examples, as the EWMA value approaches the power limit PL1, DPTF 110, or some other component, may reduce the level of the turbo feature being used, such as by reducing the frequency of processor 106. The Tau parameter may affect the ramp up of EWMA as a higher Tau value ramps the EWMA value faster than a lower Tau value. Accordingly, a higher Tau value may result in a shorter timeframe of the turbo feature use.

Power limit PL2 works as a cap to the maximum power level used by processor 106. As soon as the power used by processor 106 reaches power limit PL2, DPTF 110 reduces the level of turbo being used. A lower level of power limit PL2 may allow the EWMA to stay below power limit PL1 for longer than if a higher value is used.

Using both power limits allows the peak power for processor 106 to exceed the average power for short periods to allow for better performance for short duration workloads while staying in the long term, average, power budget for thermal constraints of processor 106. However, when the power budget is reached, such as when the EWMA value reaches power limit PL1, DPTF 110 may limit the power used by processor 106, such as by throttling the operation of processor 106 (e.g., lowering the frequency).

DPTF 110 dynamically adjusts power limit PL1 and/or power limit PL2. Instead of just adjusting the limits based on when the power limits are reached, some embodiments predict the characteristics of a future workload. For example, prediction engine 102 may receive the hardware data from platform hardware 104. The hardware data may be data from the operation of processor 106, but also from components of platform hardware 104. The hardware data may describe characteristics of a workload being executed by processor 106. Also, classifier 201 may use prior predictions made by prediction engine 102. The prior predictions may be used to determine which workload may be more likely to occur by weighting prior predictions determined as being more likely.

Then, prediction engine 102 may generate a workload prediction that predicts characteristics of a workload being executed by processor 106 for a future time period. For example, prediction engine 102 may predict that the behavior of a future workload to be executed by processor 106 may most likely to be within one of a number of classifications. For example, prediction engine 102 may output whether the upcoming workload will be one of an idle workload, a battery-life workload, a bursty workload, a semi-active workload, and a sustained workload. Although these classifications are discussed, other classifications may be appreciated, such as sustained+gaming, sustained+IA compute, etc. Any classification that might benefit from different power level PL1 and power level PL2 ratios can be used. As will be discussed in more detail below, prediction engine 102 may predict one of the workloads or may predict probabilities for each of the classifications.

The idle workload is where power is consistently low for long periods of time. The battery life workload is where power is relatively low, but processor 106 may be actively performing a task, such as video playback for a long period of time. The battery life and idle workloads may be similar. That is, the power used for the battery life and idle workloads over the time period is relatively low without any bursty behavior.

A sustained workload may have a power level that is relatively high with few or no periods of idleness. The power level PL2 budgets are exhausted and the power level PL1 budget will be exhausted eventually. The power used in the sustained workload remains high for a long period of time without any periods of idleness.

A bursty workload consumes a relatively constant average amount of power; however, bursts of activity interrupt periods of relative idleness. The bursts are short enough and spaced such that the power limit PL1 budget is typically not exhausted. The bursts occur with periods of idleness in between the bursts.

The semi-active workload consumes a relatively constant average amount of power, but bursts of activity interrupt periods of relative idleness. The bursts are long enough that some bursts may exhaust the power limit PL2 budget. For example, bursts are irregular, but are long enough that the PL2 budget may be exhausted.

Different workload classification rules may be used to classify workloads. The rules may use average power, residency, average burst length, transitions count, longest burst, and average burst length as characteristics to define workloads. The average power may be package power, the residency may be package active duty cycle, the average burst length may be sum of time with power above thermal design power (TDP) divided by burst count, transitions count may be a count of power transitions from below to above TDP and back, and the longest burst may be the longest time the power is continuously above TDP.

Once receiving the workload prediction, DPTF 110 may then adjust power limit PL1 and/or power limit PL2 based on the prediction. For example, if the workload prediction is a bursty classification, then DPTF 110 may increase the values for power limit PL1 and/or power limit PL2 to optimize the time that the turbo feature will be on during the bursty period of the workload. That is, the bursty workload may only be on for a short time so a higher power limit PL2 may maximize the time the turbo feature is turned on and allow the power used to extend higher for a short period of time. However, if the workload prediction is a sustained classification, then DPTF 110 may decrease the values for power limit PL1 and power limit PL2 to increase the time that the turbo feature will be on during the longer period of activity for the workload.

Workload Prediction

Figure 2:
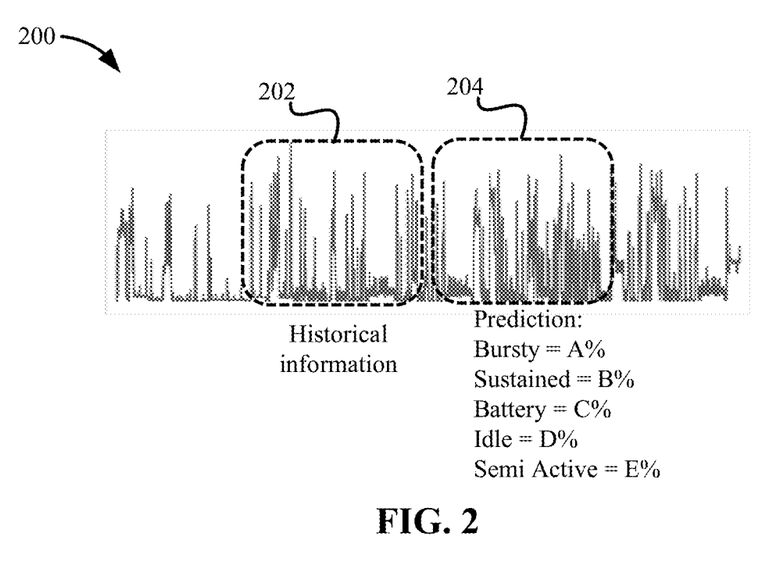
FIG. 2 shows an example of a graph of a workload according to some embodiments.

FIG. 2 shows an example of a graph 200 of a workload behavior according to some embodiments. For example, graph 200 depicts the power used by the workload. At 202, historical information is shown. In this example, the power by processor 106 used over a prior time period (e.g., the last twenty seconds) is shown; however, prediction engine 102 may use hardware data other than power to determine the historical workload behavior of a workload being executed by processor 106. Prediction engine 102 learns the workload behavior during the period shown in 202. Then, prediction engine 102 predicts the workload behavior in a time period at 204. Prediction engine 102 may use the characteristics of the workload behavior in time period 202 and the prior predictions during time period 202 to predict the workload behavior in time period 204.

In some embodiments, prediction engine 102 may predict the probability that the workload may exhibit behavior according to each of the classifications. For example, prediction engine 102 may predict that the workload may be associated with a bursty behavior, a sustained behavior, a battery life behavior, an idle behavior, and a semi-active behavior with respect to percentages A %, B %, C %, D %, and E %, respectively. If prediction engine 102 predicts that it is most likely the future workload will exhibit a bursty behavior, then A % may equal 90%. Percentages for B, C, D, and E may then be cumulatively below 10%. In other examples, prediction engine 102 may select one of the classifications. For example, prediction engine 102 may select the bursty classification as the prediction for the time period 204.

Prediction Process

Figure 3:
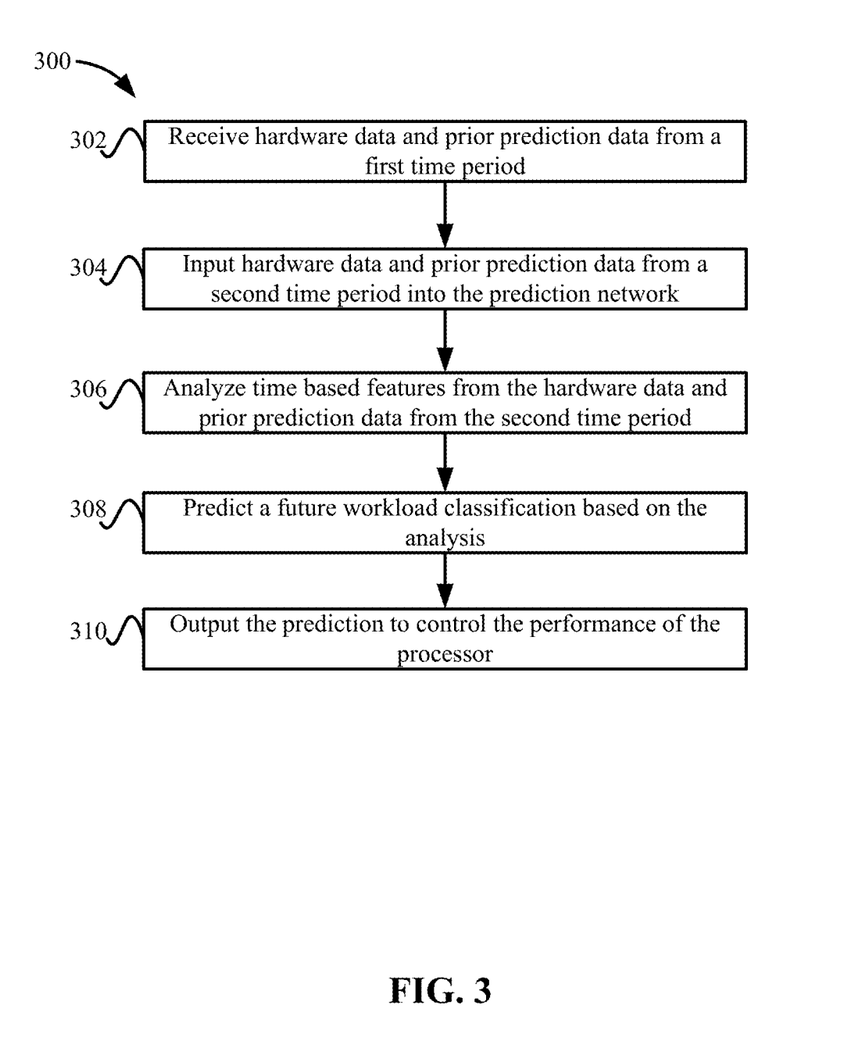
FIG. 3 depicts a simplified flowchart of a method for performing the prediction according to some embodiments.

The prediction process will be described in more detail. FIG. 3 depicts a simplified flowchart 300 of a method for performing the prediction according to some embodiments. At 302, prediction engine 102 receives hardware data and prior prediction data from a first time period. For example, new hardware data may be received at set intervals, such as new hardware data may be received every second, every five seconds, every minute, etc. The hardware data may include hardware counters, such as counters for power, residency, etc. Other hardware data regarding the operation of processor 106 or any component of platform hardware 104 may also be used.

At 304, prediction engine 102 inputs the hardware data and the prior prediction data from a second time period into a classifier. The classifier may use a prediction model, such as a machine learning model to generate a prediction. The machine learning model is trained with hardware data and ground truths to predict workload classifications. Then, prediction engine 102 generates a prediction based on historical data from the second time period. For example, instead of only using hardware data from a last second, prediction engine 102 may combine the most recent hardware data with hardware data from the last 20 seconds. Further, the prior prediction data may have been the output of the classifier for the last 5, seconds, 10 second, 20 seconds, etc. For example, the probability percentages for the classifications for the last 20 seconds may be used.

At 306, prediction engine 102 analyzes features, such as time-based features, from the hardware data and the prior prediction data from the second time period. The time-based features may be based on the changes in the values over the second time period. For example, the time-based features may include changes in power being used over the 20-second time period. Prediction engine 102 may use the changes in power to predict which of the classifications of different workloads may be most likely to occur in a future time period.

At 308, prediction engine 102 predicts a future workload classification based on the analysis. For example, based on the input, prediction engine 102 may generate the probabilities for each of the classifications.

At 310, prediction engine 102 outputs the prediction, which DPTF 110 can use to control the performance of processor 106, such as by adjusting power limit PL1 and/or power limit PL2. In some embodiments, DPTF 110 may include a table that is used to adjust the power limit PL1 and/or power limit PL2. For example, DPTF 110 may select the workload classification that has the highest probability. Then, DPTF 110 looks up values for the workload classification in the table and retrieves values for the power limit PL1 and/or power limit PL2. Then, DPTF 110 applies the values to the operation of processor 106. In other examples, the probability percentages for one or more of the workload classifications may be used to adjust the power limit PL1 and/or power limit PL2. For example, as the percentage of the bursty classification increases, DPTF 110 may gradually increase the values for power limits PL1 and PL2. In other examples, another classifier may be used to predict the values for power limits PL1 and PL2 based on the output of prediction engine 102. The probabilities may be input into the second network and the second network may predict the values for power limit PL1 and/or power limit PL2. Further, prediction engine 102 may be configured to output the values for power limit PL1 and/or power limit PL2 based on the probabilities determined for the workload classifications.

Figure 4:
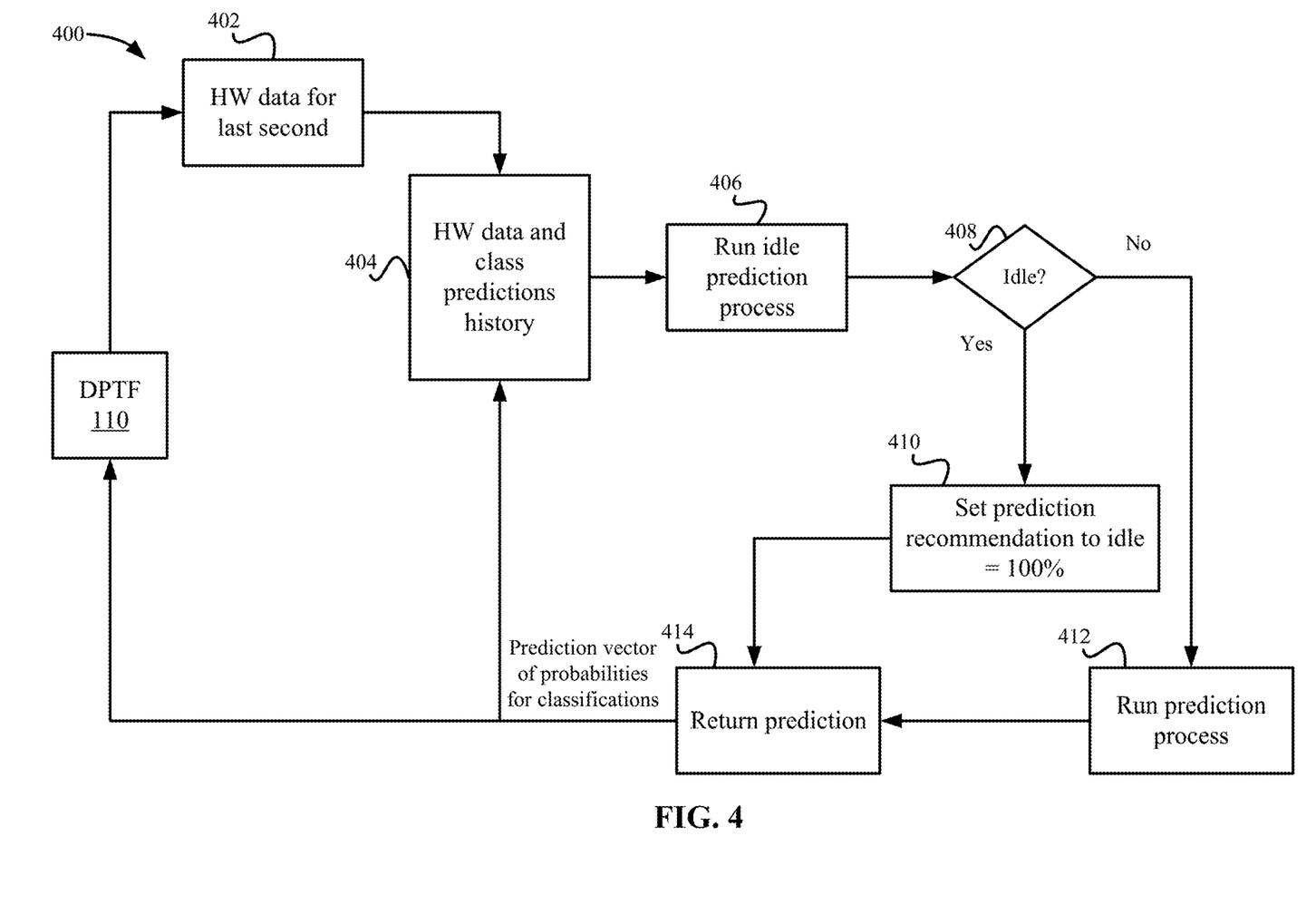
FIG. 4 depicts a more detailed flowchart of the prediction process according to some embodiments.

The above process may be further defined to minimize power usage of the prediction process during processor idle periods. FIG. 4 depicts a more detailed flowchart 400 of the prediction process according to some embodiments. In some embodiments, the process is run at every time interval, such as the process wakes up every second. At 402, prediction engine 102 receives hardware data and classification predictions for the last second. Then, at 404, the hardware data for the last second is added to the hardware data and the classification predictions added to the classification predictions history. In some examples, the last 20 seconds of hardware data and classification predictions history may be used.

At 406, prediction engine 102 may run an idle prediction process, but running this process is not necessary. For example, if processor 106 is idle, then some embodiments do not want to use additional processing power to predict the future workload behavior from all possible classifications while running in idle. This is because it is desirable to minimize the power used while processor 106 is idle and performing the prediction may use some power. The idle prediction process may determine that processor 106 is idle by evaluating/comparing the power consumption to the system floor power (e.g., a minimum power) and/or other hardware data in reference to data typically used when a system is in idle. This comparison may not use a classifier and may use less power to determine the system is in idle. Also, when processor 106 is operating in idle mode, then the power limits PL1 and PL2 do not necessarily need to be changed because the power limit budgets will not be used up by the idle workload. At 408, if processor 106 is idle, then at 410, prediction engine 102 sets the prediction recommendation to idle=100%. The percentages for the other workloads are thus 0%.

If the prediction is not idle, then at 412, prediction engine 102 runs the prediction process through the classifier. For example, the process of FIG. 3 may be performed to generate the prediction for the classifications.

At 414, the prediction is returned either from the idle prediction process or the classifier. In some embodiments, prediction engine 102 returns the prediction as a prediction vector of probability for the classifications. For example, the prediction vector may indicate different probabilities for each of the workload classifications. Prediction engine 102 sends the prediction to DPTF 110 and also stores the prediction in the history of classification predictions at 404.

Performance Example

Figure 5:
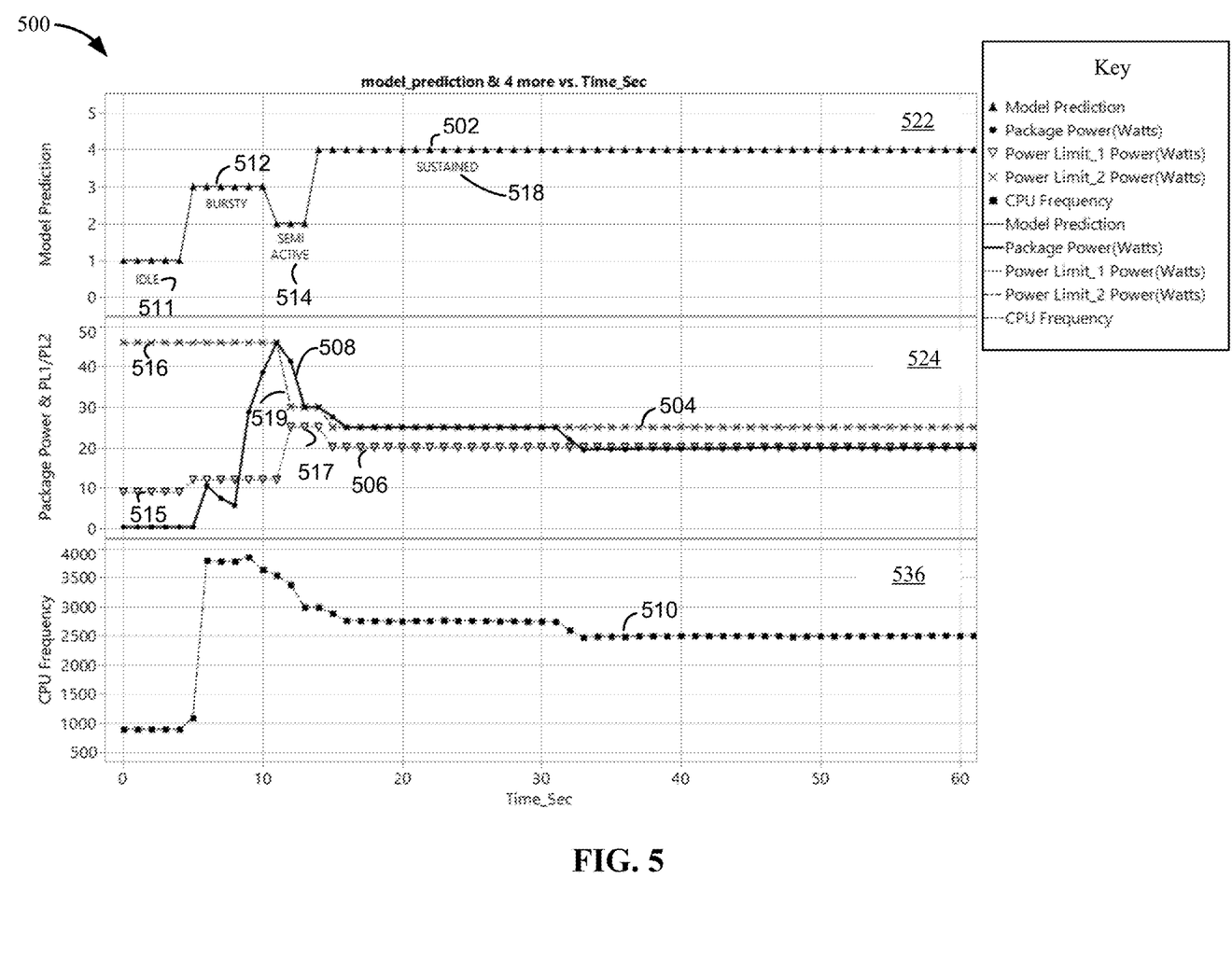
FIG. 5 depicts a graph that shows the prediction process over time according to some embodiments.

FIG. 5 depicts a graph 500 that shows the prediction process over time according to some embodiments. The model prediction over time is shown at 522; the changes in power limit PL1 and power limit PL2, and the impact on power used by processor 106 is shown at 524; and the CPU frequency changes over time is shown at 526. The model prediction may be from a value of 0.0 to 5.0. In some examples, the value of 1 is the idle classification; a value of 2 is the semi-active classification; a value of 3 is the bursty classification; a value of 4 is the sustained classification; and a value of 5 is the battery life classification. A line 502 shows the predictions output by prediction engine 102.

At 524, a line 504 depicts the power limit PL2, a line 506 depicts the power limit PL1, and a line 508 depicts the power used by processor 106, such as the power used in a package for a system-on-a-chip. At 536, a line 510 depicts the processor frequency, such has a max CPU frequency. Generally, when the turbo feature is used, the CPU frequency may be increased.

As the workload behavior changes, as shown by the change in power in line 508, the model prediction changes as shown by line 502. For example, the workload starts at idle at 511, 0 W power, and around an 800 frequency for 5 sec. Then, at 512, the prediction transitions to a bursty workload. In this example, the power used then spikes in a bursty manner from 0 W to over 10 W, back down to around 5 W, and then up to over 40 W. Then, at 514, the prediction transitions from a bursty classification to a semi-active classification. In this example, the power used has reached a peak over 40 W and is decreasing to around 30 W. Then, at 518, the prediction transitions from a semi-active classification to a sustained classification. This is because the power used levels off at a power level around 20-25 watts and is sustained around that level.

According to the prediction changes, DPTF 110 adjusts the power limits PL1 and PL2. For example, at 516, power limit PL2 started out at a high level at over 40 W, which was appropriate for the idle and bursty workload classifications. However, when the workload transitioned to a semi-active workload classification, then DPTF 110 decreased the power limit PL2. Also, the power limit PL1 started at a low level around 10 W at 515, which was acceptable for the idle and the bursty workloads, but when the workload transitioned to the semi-active classification, DPTF 110 increased the power limit PL1 to around 25 W at 517 and deceased power limit PL2 to around 30 W at 519. DPTF 110 increased the power limit PL1 and decreased the power limit PL2 to increase the duration that the turbo feature can run without using the power budget for the semi-active workload. Then, when the workload classification becomes sustained, the power limits PL1 and PL2 may settle at a lower level that allows the turbo feature to run for a longer periods of time in a lower power use environment.

CONCLUSION

Accordingly, some embodiments can predict the future workload classifications based on historical hardware data and prior predictions. Predicting the future workload classification allows DPTF 110 to tailor the power limits PL1 and PL2 to workloads being processed the performance of processor 106. As discussed above, the power limits may be adjusted such that the turbo feature can be optimized per workload. Processor 106 may be more aggressive with bursty performance configurations that improve user experience without comprising the sustained workloads' performance or compromising low power workloads that impact battery life.

In some embodiments, a method for predicting workload classifications includes: receiving, by a computing device, data regarding processing of a workload by a processor; inputting, by the computing device, the data into a prediction engine configured to classify the data into a plurality of workload classifications, wherein each workload classification describes different temporal behavior of the workload; and outputting, by the computing device, a prediction for at least one of the plurality of workload classifications, wherein the prediction is used to control performance of the processor in an upcoming period of time.

In some embodiments, the performance of the processor is controlled by: adjusting at least one of a first power limit used to limit a peak power of the processor and a second power limit used to limit an average power of the processor.

In some embodiments, the performance of the processor is controlled by: performing at least one of dynamically increasing the first power limit to increase the limit for peak power of the processor and dynamically increasing the second power limit to increase the limit of the average power of the processor when the workload classification indicates the power used by the processor will be higher over the upcoming period of time.

In some embodiments, the performance of the processor is controlled by: performing at least one of dynamically decreasing the first power limit to decrease the limit for peak power of the processor and dynamically decreasing the second power limit to decrease the limit of the average power of the processor when the workload classification indicates the power used by the processor will be lower over the upcoming period of time.

In some embodiments, the first power limit and the second power limit are used to control a feature that allows the processor to operate at a frequency greater than a value when the feature is not used.

In some embodiments, inputting the data into the prediction engine includes: determining whether the processor is processing an idle workload; and when the processor is processing an idle workload, outputting the prediction as an idle classification.

In some embodiments, the prediction of other workload classifications by the prediction engine is bypassed when it is determined that the processor is processing the idle workload.

In some embodiments, inputting the data into the prediction engine includes: when the processor is not processing the idle workload, generating the prediction for the plurality of workload classifications.

In some embodiments, the prediction for at least one of the plurality of workload classifications outputs a probability for each of the plurality of workload classifications.

In some embodiments, the prediction for at least one of the plurality of workload classifications selects one of the plurality of workload classifications.

In some embodiments, the prediction engine generates time based features from the data to generate the prediction.

In some embodiments, the plurality of workload classifications comprise an idle classification, a battery life classification, a bursty classification, a semi active classification, and a sustained classification.

In some embodiments, additional data regarding processing of the workload for a number of intervals for a past time period is combined with the received data and inputted into the prediction engine, and the data regarding processing of the workload is combined with prior predictions from the prediction engine from the past time period and input into the prediction engine.

In some embodiments, a non-transitory computer-readable storage medium has stored thereon computer executable instructions, which when executed by a computer device, cause the computer device to be operable for: receiving data regarding processing of a workload by a processor; inputting the data into a prediction engine configured to classify the data into a plurality of workload classifications, wherein each workload classification describes different temporal behavior of the workload; and outputting a prediction for at least one of the plurality of workload classifications, wherein the prediction is used to control performance of the processor in an upcoming period of time.

In some embodiments, the performance of the processor is controlled by: adjusting at least one of a first power limit used to limit a peak power of the processor and a second power limit used to limit an average power of the processor.

In some embodiments, the performance of the processor is controlled by: performing at least one of dynamically increasing the first power limit to increase the limit for peak power of the processor and dynamically increasing the second power limit to increase the limit of the average power of the processor when the workload classification indicates the power used by the processor will be higher over the upcoming period of time; and performing at least one of dynamically decreasing the first power limit to decrease the limit for peak power of the processor and dynamically decreasing the second power limit to decrease the limit of the average power of the processor when the workload classification indicates the power used by the processor will be lower over the upcoming period of time.

In some embodiments, a method for predicting workload classifications includes: receiving, by a computing device, data regarding processing of a workload by a processor; performing, by the computing device, a first prediction process to determine if the data indicates the processor is processing an idle workload; when the first prediction process does not indicate the processor is processing the idle workload: performing, by the computing device, a second prediction process to classify the data into a plurality of workload classifications, wherein each workload classification describes different temporal behavior of the workload; and outputting, by the computing device, a prediction for at least one of the plurality of workload classifications, wherein the prediction is used to control performance of the processor in an upcoming period of time; when the first prediction process does not indicate the processor is processing the idle workload: setting, by the computing device, the prediction to an idle classification without performing the second prediction process.

In some embodiments, the performance of the processor is controlled by: adjusting at least one of a first power limit used to limit a peak power of the processor and a second power limit used to limit an average power of the processor.

In some embodiments, the performance of the processor is controlled by: performing at least one of dynamically increasing the first power limit to increase the limit for peak power of the processor and dynamically increasing the second power limit to increase the limit of the average power of the processor when the workload classification indicates the power used by the processor will be higher over the upcoming period of time.

In some embodiments, the performance of the processor is controlled by: performing at least one of dynamically decreasing the first power limit to decrease the limit for peak power of the processor and dynamically decreasing the second power limit to decrease the limit of the average power of the processor when the workload classification indicates the power used by the processor will be lower over the upcoming period of time.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for operating a computing device, the method comprising:
  receiving, by the computing device, data regarding processing of a workload by a processor;
  performing, by the computing device, a determination on whether the data indicate the processor is processing an idle workload;
  when the data does not indicate the processor is processing the idle workload:
    performing, by the computing device, a classification of the data into a plurality of workload classifications, wherein each workload classification describes different temporal behavior of the workload; and
    outputting, by the computing device, a prediction for at least one of the plurality of workload classifications, wherein the prediction is used by the computing device to control performance of the processor in an upcoming period of time;
    wherein to control the performance of the processor in the upcoming period of time, the computing device dynamically adjusts a power limit used to limit an average power of the processor, and dynamically adjusts a size of a window to determine the average power of the processor, for the upcoming period of time.

2. The method of claim 1, wherein to control the performance of the processor in the upcoming period of time, the computing device further dynamically adjusts another power limit used to limit a peak power of the processor.

3. The method of claim 1, wherein dynamically adjusting the power limit used to limit the average power of the processor, and the size of the window to determine the average power of the processor, for the upcoming period of time, comprises: dynamically increasing the power limit to increase the limit of the average power of the processor when the workload classification indicates the power used by the processor will be higher over the upcoming period of time.

4. The method of claim 2, wherein dynamically adjusting the power limit used to limit the average power of the processor, and the size of the window to determine the average power of the processor, for the upcoming period of time, comprises:
dynamically decreasing the power limit to decrease the limit of the average power of the processor when the workload classification indicates the power used by the processor will be lower over the upcoming period of time.

5. A non-transitory computer-readable storage medium having stored thereon computer executable instructions, which when executed by a computer device, cause the computer device to:
receive data regarding processing of a workload by a processor;
determine if the data indicates the processor is processing an idle workload;
when the processor is not processing the idle workload:
classify the data into a plurality of workload classifications, wherein each workload classification describes different temporal behavior of the workload; and
output a prediction for at least one of the plurality of workload classifications, wherein the prediction is used to control performance of the processor in an upcoming period of time;
wherein to control the performance of the processor in the upcoming period of time, the computing device is caused to dynamically adjust a power limit used to limit an average power of the processor, and dynamically adjust a size of a window to determine the average power of the processor, for the upcoming period of time.

6. The non-transitory computer-readable storage medium of claim 5, wherein the performance of the processor is further controlled by:
adjusting another power limit used to limit a peak power of the processor.

7. The non-transitory computer-readable storage medium of claim 6, wherein the performance of the processor is controlled by:
performing at least one of dynamically increasing a first power limit to increase the limit for peak power of the processor and dynamically increasing a second power limit to increase the limit of the average power of the processor when the workload classification indicates the power used by the processor will be higher over the upcoming period of time.

8. The non-transitory computer-readable storage medium of claim 6, wherein the performance of the processor is controlled by:
performing at least one of dynamically decreasing a first power limit to decrease the limit for peak power of the processor and dynamically decreasing a second power limit to decrease the limit of the average power of the processor when the workload classification indicates the power used by the processor will be lower over the upcoming period of time.

9. A computing system, comprising:
hardware platform including a processor; and
a prediction engine operatively coupled with the processor to:
receive data from the hardware platform regarding processing of a workload by the processor;
perform a first prediction process to determine if the data indicates the processor is processing an idle workload;
when the first prediction process does not indicate the processor is processing the idle workload:
perform a second prediction process to classify the data into a plurality of workload classifications, wherein each workload classification describes different temporal behavior of the workload; and
output a prediction for at least one of the plurality of workload classifications, wherein the prediction is used to control performance of the processor in an upcoming period of time by, at least in part, dynamically adjusting a size of a window to determine an average power of the processor, for the upcoming period of time;
when the first prediction process indicates the processor is processing the idle workload:
set the prediction to an idle classification without performing the second prediction process.

10. The computing system of claim 9, wherein the performance of the processor is controlled by:
adjusting at least one of a first power limit used to limit a peak power of the processor and a second power limit used to limit the average power of the processor.

11. The computing system of claim 10, wherein the performance of the processor is controlled by:
performing at least one of dynamically increasing the first power limit to increase the limit for peak power of the processor and dynamically increasing the second power limit to increase the limit of the average power of the processor when the workload classification indicates the power used by the processor will be higher over the upcoming period of time.

12. The computing system of claim 10, wherein the performance of the processor is controlled by:
performing at least one of dynamically decreasing the first power limit to decrease the limit for peak power of the processor and dynamically decreasing the second power limit to decrease the limit of the average power of the processor when the workload classification indicates the power used by the processor will be lower over the upcoming period of time.

* * * * *